United States Patent
Hawtof et al.

(10) Patent No.: US 9,634,349 B2
(45) Date of Patent: Apr. 25, 2017

(54) HIGH SILICA CONTENT SUBSTRATE SUCH AS FOR USE IN THIN-FILM BATTERY

(71) Applicant: Corning Incorporated, Corning, NY (US)

(72) Inventors: Daniel Warren Hawtof, Corning, NY (US); Archit Lal, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 200 days.

(21) Appl. No.: 14/684,627

(22) Filed: Apr. 13, 2015

(65) Prior Publication Data
US 2016/0301095 A1 Oct. 13, 2016

(51) Int. Cl.
| | |
|---|---|
| H01M 10/04 | (2006.01) |
| H01M 4/505 | (2010.01) |
| H01M 4/38 | (2006.01) |
| H01M 4/485 | (2010.01) |
| H01M 4/587 | (2010.01) |
| H01M 4/525 | (2010.01) |
| H01M 4/58 | (2010.01) |

(Continued)

(52) U.S. Cl.
CPC ....... *H01M 10/0436* (2013.01); *H01M 4/387* (2013.01); *H01M 4/485* (2013.01); *H01M 4/505* (2013.01); *H01M 4/525* (2013.01); *H01M 4/587* (2013.01); *H01M 4/5815* (2013.01); *H01M 4/5825* (2013.01); *H01M 4/664* (2013.01); *H01M 6/40* (2013.01); *H01M 10/0525* (2013.01); *H01M 10/0585* (2013.01); *H01M 4/667* (2013.01); *H01M 2004/027* (2013.01); *H01M 2004/028* (2013.01); *H01M 2220/30* (2013.01)

(58) Field of Classification Search
CPC .. H01M 10/0436; H01M 4/525; H01M 4/505; H01M 4/5825; H01M 4/5815; H01M 4/485; H01M 4/587; H01M 4/387; H01M 2220/30; H01M 2004/028; H01M 2004/027
See application file for complete search history.

(56) References Cited

U.S. PATENT DOCUMENTS

| | | |
|---|---|---|
| 3,375,135 A | 3/1968 | Moulton et al. |
| 7,677,058 B2 | 3/2010 | Hawtof et al. |

(Continued)

OTHER PUBLICATIONS

Dudney, Nancy J.; "Thin Film Micro-Batteries"; The Electrochemical Society, Interface (Fall 2008); pp. 44-48.

(Continued)

*Primary Examiner* — Carlos Barcena
(74) *Attorney, Agent, or Firm* — Russell S. Magaziner

(57) ABSTRACT

A high silica content substrate, such as for a thin-film battery, is provided. The substrate has a high silica content, such as over 90% by weight silica, and is thin, for example less than 500 μm. The substrate may include a surface with a topography or profile that facilitates bonding with a coating layer, such as a coating of an electrochemical battery material. The high silica content substrate may be flexible, have high temperature resistance, high strength and/or be non-reactive. The substrate may be suitable for use in the high temperature environments used in many chemical deposition or formation processes, such as electrochemical battery material formation processes.

29 Claims, 5 Drawing Sheets

(51) Int. Cl.
*H01M 4/66* (2006.01)
*H01M 10/0525* (2010.01)
*H01M 10/0585* (2010.01)
*H01M 6/40* (2006.01)
*H01M 4/02* (2006.01)

(56) References Cited

U.S. PATENT DOCUMENTS

| | | |
|---|---|---|
| 8,062,733 B2 | 11/2011 | Hawtof et al. |
| 8,077,367 B2 | 12/2011 | Gollier |
| 8,113,015 B2 | 2/2012 | Burdette |
| 8,181,485 B2 | 5/2012 | Coffey et al. |
| 8,359,884 B2 | 1/2013 | Hawtof |
| 9,296,614 B1 | 3/2016 | Lal et al. |
| 2008/0003147 A1 | 1/2008 | Miller et al. |
| 2008/0213664 A1 | 9/2008 | Krasnov et al. |
| 2009/0208671 A1 | 8/2009 | Nieh et al. |
| 2010/0124709 A1 | 5/2010 | Hawtof et al. |
| 2012/0040211 A1 | 2/2012 | Murata et al. |
| 2013/0149616 A1* | 6/2013 | Lee ................ H01M 12/06 429/405 |

OTHER PUBLICATIONS

European Patent Office; International Search Report and Written Opinion of International Application No. PCT/US2016/026372, Filed Apr. 7, 2016; Mailing Date: Jun. 3, 2016; pp. 1-12.

Patent iNSIGHT Pro; "Technology Insight Report Thin Film Batteries" (Jan. 17, 2013); Gridlogics Technologies Pvt. Ltd., Copyright 2013 Gridlogics; pp. 1-48.

Xia et al.; "Growth and Characterization of $LiCoO_2$ Thin Films for Microbatteries"; Advanced Materials for Micro- and Nano-Systems (AMMNS) (2005); http://hdl.handle.net/1721.1/7364.

* cited by examiner

US 9,634,349 B2

HIGH SILICA CONTENT SUBSTRATE SUCH AS FOR USE IN THIN-FILM BATTERY

BACKGROUND

The disclosure relates generally to high-silica content substrate materials, and specifically to high-silica content substrate materials for deposition of reactive materials and/or for use in high temperature material deposition environments, such as thin-film battery material deposition. Silica soot may be generated by a process, such as flame hydrolysis. The silica soot may then be sintered to form a fully or partially sintered high silica content substrate. Thin-film batteries, such as thin-film rechargeable lithium batteries, contain thin-film layers of cathode material, anode material, separator material, electrolyte material and current collector material.

SUMMARY

One embodiment of the disclosure relates to an electrochemical battery assembly including a high silica content substrate. The substrate includes a first major surface, a second major surface opposite the first major surface, at least 90% $SiO_2$ by weight, an average thickness between the first major surface and the second major surface of less than 500 μm and a minimum dimension orthogonal to the thickness that is less than 100 m and greater than 1 mm. The electrochemical battery assembly includes a first layer of a first battery material bonded to the first major surface of the substrate. The first battery material is one of a cathode material, an anode material, an electrolyte and a current collector material.

An additional embodiment of the disclosure relates to an assembly including a substrate and a coating. The substrate includes a first major surface and a second major surface opposite the first major surface. The substrate includes at least 99% by weight silica, and the substrate is formed from a glass of $(SiO_2)_{1-x-y} \cdot M'_x M''_y$ composition, where either or both of M' and M'' is an element, dopant, or substitution, which may be in an oxide form, or combination thereof, or is omitted, and where the sum of x plus y is less than 1. The substrate includes an average thickness between the first major surface and the second major surface of less than 500 μm and a width and a length that are each less than 100 m and greater than 2 mm. The first major surface includes a plurality of raised features and a plurality of recessed features, and at least some of the raised features extend from the surface a distance of at least 10 angstroms further than the recessed features. The coating is positioned directly on the first major surface such that an inner surface of the coating contacts the first major surface. The coating is a contiguous coating that extends over at least one recessed feature and at least one raised feature and is contiguous for at least 1% of the width and the length of the substrate.

An additional embodiment of the disclosure relates to a fused quartz substrate including a first major surface having a surface area greater than 1 $mm^2$ and a second major surface opposite the first major surface. The substrate includes an outer perimeter surface extending between the first major surface and the second major surface. The substrate includes at least 99% by weight silica, has an average thickness between the first major surface and the second major surface of less than 500 μm and has a width and a length that are each less than 100 m and greater than 1 mm. The substrate includes a first group of a plurality of raised elongate features formed in the first major surface and extending in the direction of the width. Each raised elongate feature of the first group has a length and a width, and the length is at least ten times larger than width, and the width of each elongate feature of the first group is between 10 mm and 2 μm. The substrate includes a second group of a plurality of raised elongate features formed in the first major surface and extending in the direction of the length. At least some of the raised elongate features of the second group intersect a raised elongate feature of the first group. Each raised elongate feature of the second group has a length and a width, and the length is at least ten times larger than width. The width of each elongate feature of the second group is between 10 mm and 2 μm. At least some of the raised elongate features of the first group and of the second group extend from the surface a distance of at least 10 angstroms beyond the lowest portion of the first major surface. The surface area of the first major surface is at least 1.5 times the area of the cross-sectional shape defined by the outer perimeter surface of the substrate.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
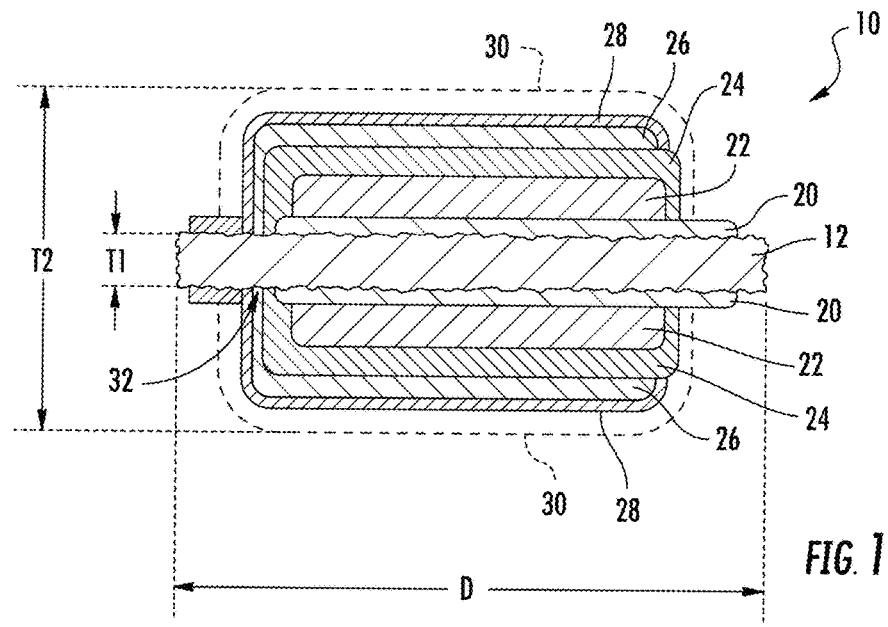
FIG. 1 shows a sectional view of a thin-film battery including a high silica content substrate according to an exemplary embodiment.

Referring generally to the figures, a high silica content substrate for use in the formation of an assembly with reactive materials or materials processed at high temperatures, such as thin-film battery materials, are shown and described. In addition, systems and processes for forming such substrates and assemblies are shown and described. The high silica substrate discussed herein provides a combination of various properties that are believed to provide significant improvements over conventional substrate materials currently used in the construction of thin-film batteries, such as thin-film lithium-based batteries. For example, the high silica substrate discussed herein has a very high softening temperature (e.g., greater than 650 degrees C., 700 degrees C., 800 degrees, etc.) which allows the high silica substrate to resist deformation or damage during high temperatures used during processing or formation of battery materials during battery assembly, such as during high temperature crystal formation. For example, to form a thin-film battery as discussed herein, battery materials may be deposited onto a high silica substrate at relatively low temperatures, and then exposed to high temperatures to form desired crystal structures during sintering or annealing processes. In addition, the high silica substrate discussed herein has a very low coefficient of thermal expansion and one which is relatively close to the coefficient of thermal expansion of battery materials. Thus, the low coefficient of thermal expansion of the substrate discussed herein provides for material coatings to be deposited on the substrate in a tight fit with a high level of bonding to the substrate. It is believed that this tight fit and high level of bonding is particularly advantageous in thin-film battery applications in which the density of battery materials bonded to the substrate is increased relative to conventional substrate materials and the conventional surface structures resulting in an increased energy density of the battery formed using the substrates discussed herein.

In addition to the advantages during battery material deposition/processing, the high silica substrate discussed herein has a variety of properties that provides additional advantages. For example, one or both major surfaces of the high silica substrate discussed herein may have a rough surface or a series of elongate raised ridges or recesses that increase the substrate surface area. This increased surface area may facilitate increased bonding with an adjacent layer of battery material, and the recesses between raised ridges may also provide an extra volume (compared to a flat or polished substrate) in which battery material may be contained resulting in higher energy density. Thus, the unique surface morphology of the substrate discussed herein may be particularly effective to increase energy density of a battery utilizing the substrate.

In addition, the high silica substrate discussed herein is both thin (e.g., less than 500 μm in thickness, less than 200 μm in thickness, etc.) and has relatively high strength (at least considering its low thickness). These two properties allow for formation of a battery in which more of the total volume of the battery is formed from the active battery materials and less volume needs to be occupied by the substrate, and thus increases the overall energy density of the battery. In addition, the high silica substrate discussed herein is highly flexible providing a substrate that may be useful in flexible multilayered assemblies, such as flexible thin-film batteries.

In addition, the substrate discussed herein provides these properties in conjunction with a high purity (e.g., high silica content), that provides a non-reactive, non-corrosive and high electrical resistance insulating substrate that is believed to function well as a support structure for reactive and conductive materials, such as thin-film battery materials. In addition, the substrate discussed herein provides a battery support structure able to withstand a wide voltage range (e.g., voltages within a window from 0 volts to 5.5 volts). Thus, it is believed that the high silica substrate discussed herein provides a combination of one or more property that provides superior functioning in various layered assemblies, such as thin-film battery assemblies, compared to conventional substrate materials, such as mica, silicon wafers, silica wafers, gallium nitride, sapphire, polymers, etc. Specifically conventional substrate materials tend be relatively thick, inflexible, irregularly shaped and expensive as compared to the high silica substrate discussed herein.

Referring to FIG. 1, an electrochemical battery assembly (e.g., an electrochemical cell, electrochemical device, etc.), shown as thin-film or solid-state battery 10, is shown. In general, battery 10 includes one or more layer of battery materials (e.g., cathode materials, anode materials, electrolyte materials, current collector materials, etc.) bonded to and/or supported by a high silica content substrate, shown as silica sheet 12. As will be explained in greater detail herein, silica sheet 12 provides various material and physical properties that provide for improved performance relative to conventional battery substrate materials, such as mica. Further, it should be understood that while many of the specific embodiments discussed herein relate to silica sheet 12 as a battery substrate, in other embodiments silica sheet 12 may be used as a substrate for any number of other applications, and in particular for other devices, systems or processes in which a thin substrate is used to receive layers or coatings of materials. For example, silica sheet 12 may also be used for carbon nanotube formation.

Figure 2:
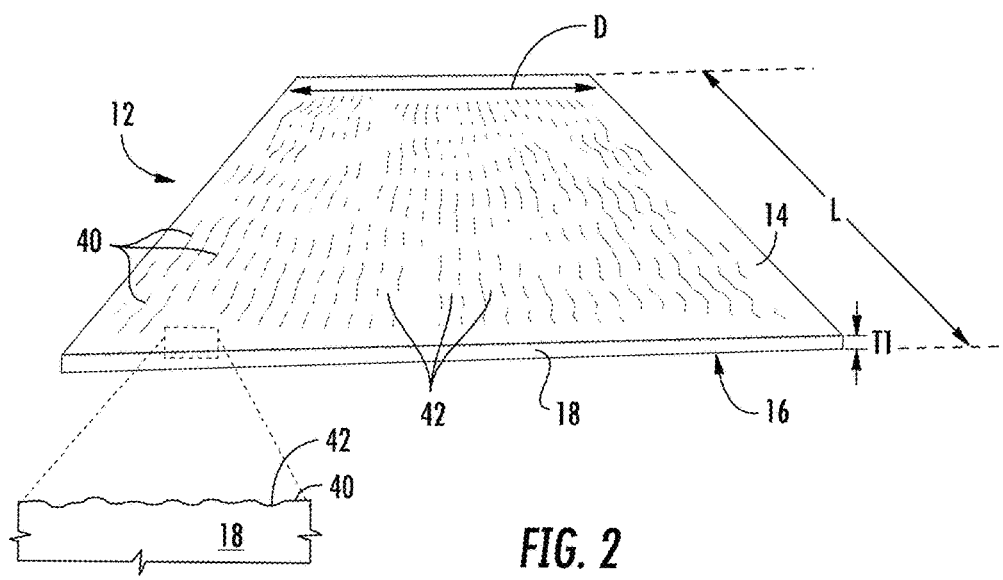
FIG. 2 is a schematic representation from a perspective view of a substrate according to an exemplary embodiment.

Referring generally to FIGS. 1 and 2, silica sheet 12 includes a first major surface, shown as upper surface 14, and a second major surface, shown as lower surface 16, that is on the opposite side of sheet 12 from upper surface 14. Silica sheet 12 includes an outer perimeter surface, shown as sidewall surface 18, that extends between outer most edges of upper surface 14 and lower surface 16.

In the embodiment shown in FIG. 1, battery 10 includes a first layer of a first battery material, shown as current collector 20, in contact with and/or bonded to upper surface 14 and also bonded to lower surface 16. Battery 10 includes a second layer of a second battery material, shown as cathode material 22, in contact with and/or bonded to an outer surface of current collector 20, and a third layer of a third battery material, shown as electrolyte material 24, in contact with and/or bonded to an outer surface of cathode material 22. Battery 10 includes a fourth layer of a fourth battery material, shown as anode material 26, in contact with and/or bonded to an outer surface of electrolyte material 24, and a fifth layer of a fifth battery material, shown as current collector 28, in contact with and/or bonded to an outer surface of anode material 26. Thus in this embodiment, the electrochemical layers of battery 10 are supported by sheet 12.

In a specific embodiment, each layer of battery material may also include a section that is directly bonded to upper surface 14 and/or lower surface 16, as shown in FIG. 1 at region 32. Bonding of each layer of battery material to sheet 12 at region 32 may facilitate structural integrity of battery 10 by providing a direct coupling of each layer of battery material to sheet 12. It should be understood that while battery 10 shows a particular ordering of battery material layers, battery 10 may include any suitable ordering of battery material layers that allows battery 10 to function as a battery.

In the specific embodiment shown, electrolyte material 24 also acts as a separator material located between cathode 22 and an anode 26 that keeps these two layers electrically isolated from each other. In various embodiments, battery 10 may include an additional outer protective layer 30 that surrounds the various layers of battery 10 leaving only small portions of current collectors 20 and 28 and the adjacent portions of sheet 12 accessible for electrical connection to a device powered by battery 10.

In various embodiments, the battery materials of layers 20, 22, 24, 26 and 28 may be any suitable battery material. In various embodiments, the cathode material of cathode 22 is a lithium based cathode material, such as lithium-nickel materials, lithium oxides, lithium phosphates, lithium sulfur, lithium mixed metal phosphates, lithium mixed metal oxides of structures (e.g., layered, olivine, spinel structures and combinations thereof). In specific embodiments, the cathode material may be $LiNiMnCoO_2$, $LiCoO_2$, $LiMn_2O_4$, $LiFePO_4$, etc. In various embodiments, the anode material of anode 26 is at least one of graphite, other forms of carbon, $Li_4Ti_5O_{12}$, an alloy of tin/cobalt and silicon-carbon materials. In various embodiments, electrolyte 24 is a solid electrolyte that also acts as spatial separator preventing electrical contact directly between the cathode to the anode. In a specific embodiment, electrolyte 24 is lithium phosphorus oxynitride (LiPON). In other embodiments, battery 10 may include a separator layer that is distinct and separate from the electrolyte material, and in such embodiments, the separator layer may be a non-liquid material such as zirconia or garnet. In various embodiments, the current collectors 20 and 28 may be any suitable current collector material, including copper materials, aluminum materials, aluminum/carbon materials, carbon nanotubes, fibers, etc.

The various layers of battery materials may be deposited using any suitable deposition method including, pulsed laser deposition, magnetron sputtering, chemical vapor deposition, MOCVD, sol-gel processing and others. In various embodiments, sheet 12 is a glass sheet formed from a silica soot sheet that is masked and annealed to create a 3D surface structure (discussed below) that is capable of handling the high temperatures need to deposit and/or anneal the anode, cathode and electrolyte materials.

In various embodiments, thin-film battery 10 discussed herein may be used in a wide variety of applications, in which the various physical properties discussed herein (e.g., high energy density, high power, thin, minimal foot print, flexibility, strength, etc.) are advantageous. For example, battery 10 may be used in thin portable devices such as portable consumer electronics and medical devices. In some embodiments, battery 10 may be used in implantable medical devices such as defibrillators and neural stimulators. In some embodiments, battery 10 may be used with "smart" cards, RFID tags and wireless sensors. In certain embodiments, battery 10 can serve to store energy collected from solar cells and other energy harvesting devices.

Referring to FIGS. 1 and 2, upper surface 14 and/or lower surface 16 of sheet 12 includes a non-flat or non-polished surface texture or profile that includes a plurality of raised features 40 and recessed features 42. In various embodiments, raised features 40 and recessed features 42 have irregular profile shapes in cross-section as shown in FIGS. 1 and 2. In other embodiments, raised features 40 and recessed features 42 have a consistent or repeating profile shape in cross-section.

In various embodiments, at least some of the raised features 40 extend from the surface of sheet 12 a distance of at least 10 angstroms further than the recessed features 42, such as at least 50 angstroms, such as at least 100 angstroms, such as at least 500 angstroms. In some embodiments, raised features 40 extend from the surface of sheet 12 a distance of at least 1 μm beyond the lowest portion of upper surface 14 (e.g., the lowest of the lowest recessed portion), and more specifically at least 2 μm beyond the lowest recessed portion. In various embodiments, upper surface 14 and/or lower surface 16 are primarily unpolished such that the surface has a surface roughness Ra of greater than 1.5 angstrom for a 40 μm by 30 μm area thereon, which may be a subsection of the total area of surface. In another embodiment, however, upper surface 14 and/or lower surface may be polished such that that surface roughness Ra is less than 1.5 angstrom for a 40 μm by 30 μm area section.

In various embodiments, the surface texture provided by raised features 40 and recess features 42 may provide a surface that facilitates bonding to various coating layers (e.g., layers of battery material). For example, raised features 40 and recessed features 42 may increase the surface area of upper surface 14 and/or lower surface 16 (as compared to a flat or polished surface) providing additional area for adjacent coating layers to be bonded to sheet 12. Further, it is believed that raised features 40 and recessed features 42 may provide for a more robust connection between sheet 12 and the adjacent layer by forming somewhat of interlocking engagement between the adjacent surfaces.

As shown best in FIG. 1, at least one layer coated on sheet 12 (e.g., current collector 20 in the exemplary embodiment in FIG. 1) is positioned directly on the major surfaces of sheet 12 such that an inner surface of the coating layer contacts upper surface 14 and/or lower surface 16. In this embodiment, the first coating layer is a contiguous coating layer that contacts upper surface 14 and/or lower surface 16 on at least one recessed feature 42 and at least one raised feature 40. In one embodiment, one or more coating layer is contiguous for at least 1% of the width and/or length of the substrate, and more specifically, at least 10% of the width and/or length of the substrate. In such embodiments, the innermost coating layer is contiguous extending over a plurality of recessed features 42 and raised features 40. In a specific embodiment, the innermost coating layer is a contiguous layer that covers at least 25% of the area of upper surface 14 and/or lower surface 16, at least 50% of the area of upper surface 14 and/or lower surface 16 and more specifically at least 70% of the area of upper surface 14 and/or lower surface 16. In specific embodiments in which sheet 12 is a battery substrate, at least 90% of the area of upper surface 14 and/or lower surface 16 is covered by at least one layer of battery material.

In various embodiments, the presence of raised features 40 and recessed features 42 provides upper surface 14 and/or lower surface 16 with an area that is greater than the area of the same shaped surface that is polished smooth. In specific embodiments, the surface area of upper surface 14 or of lower surface 16 is greater than the area of a cross-section shape defined by sidewall 18. In specific embodiments, the surface area of upper surface 14 or of lower surface 16 is at least 1.5 times greater than the area of a cross-section shape defined by sidewall 18, and more specifically is at least 2 times greater than the area of a cross-section shape defined by sidewall 18. Further, in those embodiments in which the coating layers are battery layers, the increased surface area relative to a flat or polished surface area may allow for an increased battery energy density. In specific embodiments, the area of upper surface 14 and/or of lower surface 16 is greater than 1 $mm^2$, and more specifically is greater than 2 $mm^2$.

Figure 3:
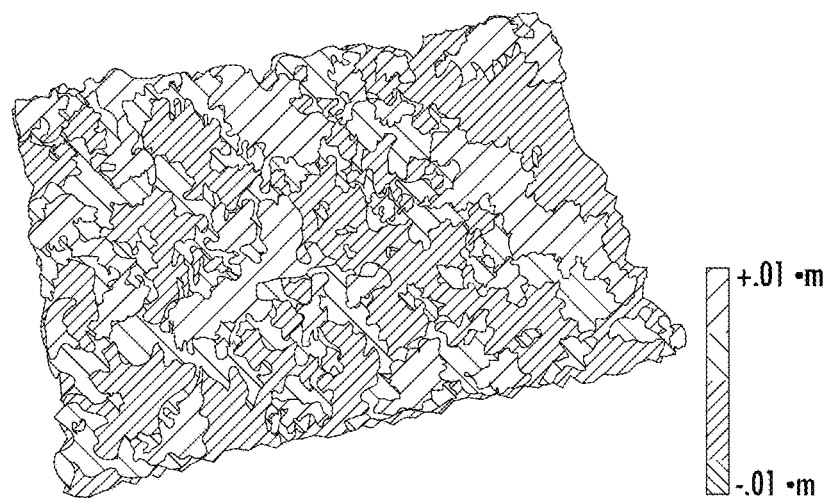
FIG. 3 is a 3D nano-scale representation of a measured profile of a surface of substrate according to an exemplary embodiment.
Figure 4:
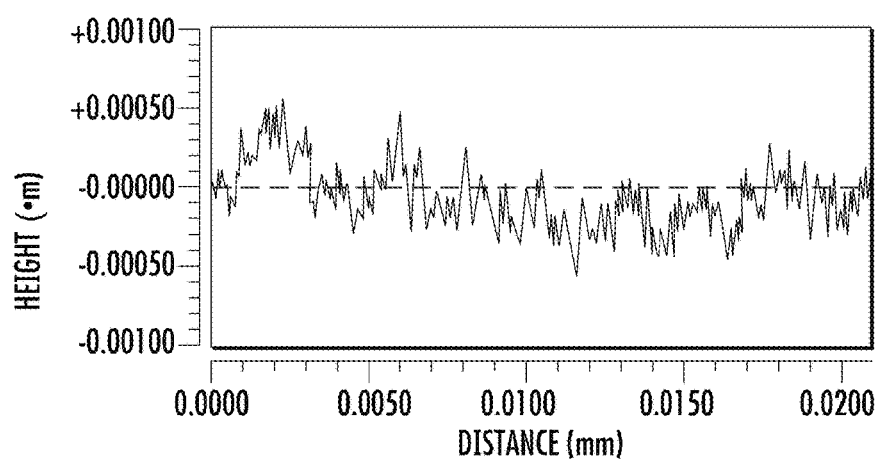
FIG. 4 is a 2D nano-scale representation of a measured profile of the surface of FIG. 3.

Referring to FIG. 3 and FIG. 4, examples of an unpolished surface of sheet 12 are shown according to various exemplary embodiments. For example, FIG. 3 shows a 3D representation of a 40 μm by 30 μm area of upper surface 14 of sheet 12 according to an exemplary embodiment. FIG. 4 shows a 2D representation of nanostructure of the same substrate sample as FIG. 3. Both FIGS. 3 and 4 show the raised and recessed features 40, 42 of surface 14 on a nano-scale, where upper surface 14 is non-flat or unpolished.

Referring back to FIG. 1 and FIG. 2, sheet 12 has a thickness, shown as T1, that generally is the distance between opposing portions of upper surface 14 and lower surface 16. In some embodiments discussed herein T1 is a specific thickness between two opposing points along upper surface 14 and lower surface 16, and in other embodiments, T1 is an average thickness between all opposing points along upper surface 14 and lower surface 16. In some embodiments, sheet 12 has a thickness T1 of less than 500 μm, such as less than 250 μm, and in some such embodiments less than 50 μm. According to an exemplary embodiment, T1 is between 200 μm and 1 μm, specifically between 200 μm and 5 μm and more specifically between 150 μm and 5 μm. In a particularly thin embodiment, T1 is between 1 μm and 20 μm. Thus, according to these exemplary embodiments, sheet 12 is arranged as a particularly thin sheet of silica material. Such a thin sheet may be counter-intuitive for substrate manufacturers due to the processes of cutting, grinding, lapping, and polishing, which may require or benefit from a greater thickness.

As shown in FIG. 1, the multi-layered assembly, shown as battery 10, may have a total thickness, shown as T2. As shown, T2 is the distance measured between opposing outermost surfaces of the battery assembly in a direction perpendicular to upper surface 14 and/or lower surface 16 of sheet 12. In various embodiments, T2 is between 10 μm and 600 μm, and more specifically between 20 μm and 200 μm. In various embodiments, sheet 12 is relatively thin relative to total thickness T2. In general, T1 is less than 60% of T2. In various embodiments, T1 is less than 10% of T2, specifically is less than 5% of T2 and more specifically is less than 1% of T2. In various embodiments in which the assembly supported by sheet 12 is a battery, decreasing the percentage of thickness (and consequently volume) of the battery occupied by the substrate increases the energy density of the battery.

According to an exemplary embodiment, sheet 12 has a first minimum dimension D orthogonal to the thickness (e.g., width, length, minimum surface dimension) and a second minimum dimension L orthogonal to the thickness and orthogonal to dimension D. In various embodiments, D and/or L are each less than 100 m and greater than 1 mm, and specifically are less than 5 m and greater than 2 mm. Such dimensions may be useful for battery applications and in conjunction with equipment that deposits layers of battery materials. In such embodiments, the various coating layers may be shaped to cover all or substantially all of sheet 12.

In various embodiments, sheet 12 may be formed in a variety of shapes as needed for particular layered assemblies. For example, in at least some battery applications, sheet 12 may be shaped to specifically conform to a shape within a device housing which in turn facilitates increasing the amount of battery energy within a particular volume of the device powered by the battery. In various embodiments, as shown FIG. 2, sheet 12 has a cross-sectional shape defined by sidewall 18 that is non-circular, and specifically is rectilinear. In other embodiments, sheet 12 may be circular in shape or polygonal in shape, and in yet other embodiments, sheet 12 may have an irregularly shaped sidewall 18 that is shaped to conform to components and/or to fill otherwise empty space within a device housing.

As used herein, the term "substrate" generally refers to a substance, layer or material that may underlie something, or on which some process may occur. For example, the substrate may be a top layer of a multilayered structure, an exterior layer, an internal layer, etc. In the embodiment, shown in FIG. 1, sheet 12 acts as an internal substrate layer.

In some embodiments, sheet 12 consists of at least 90% by weight, and specifically at least 99% by weight, of a material of the composition of $(SiO_2)_{1-x-y}.M'_x M''_y$, where either or both of M' and M" is an element (e.g., a metal) dopant, or substitution, which may be in an oxide form, or combination thereof, or is omitted, and where the sum of x plus y is less than 1, such as less than 0.5, or where x and y are 0.4 or less, such as 0.1 or less, such as 0.05 or less, such as 0.025 or less, and in some such embodiments greater than $1E^{-6}$ for either or both of M' and M". In some embodiments, the substrate is highly pure fuse quartz, such as at least 99.5% quartz, such as 99.9% quartz. Put another way, in some embodiments, the substrate is highly pure $SiO_2$, such as at least 90% $SiO_2$, 95% $SiO_2$, 99% $SiO_2$, 99.5% $SiO_2$, such as 99.9% $SiO_2$. In certain embodiments, sheet 12 is crystalline, and in some embodiments, sheet 12 is amorphous. In some embodiments, sheet 12 is a fused quartz material. In one embodiment, sheet 12 is a fully sintered silica sheet. In another embodiment, sheet 12 is a partial sintered silica sheet. In another embodiment, sheet 12 is unsintered silica soot sheet.

In those embodiments in which sheet 12 is a substrate for a battery, such as battery 10, the high silica purity allows sheet 12 to be unreactive with the active electrochemical materials of battery 10. In a specific embodiment in which cathode material 22 is a lithium based cathode material, the high silica content of sheet 12 allows sheet to remain unreactive with the battery materials within a voltage range of 0.1 V to 5.5 V, even at high charge and discharge levels up to 100 C levels. In various embodiments, the high silica content of sheet 12 allows sheet 12 to remain unreactive with the battery materials of the different layers both during the high temperature deposition, sintering or annealing of those materials and during charge and discharge cycles of the battery, and in addition, the high silica content of sheet 12 may also allow sheet 12 to provide insulation between the battery materials of the different layers.

In various embodiments, the high silica content of sheet 12 allows sheet 12 to handle the reactive environments (both reducing and oxidizing) and high temperatures (600° C.-1200° C.) that are typically needed for annealing and crystallization of cathode, anode and/or electrolyte materials of battery 10. In one embodiment, annealing of the cathode material crystalizes the cathode material increasing energy density of battery 10. In various embodiments, sheet 12 has a high softening point temperature, that being greater than 700° C., such as greater than 800 C, such as greater than 900° C., such as greater than 1000° C. In addition, sheet 12 has a low coefficient of thermal expansion, that being less than $10 \times 10^{-7}/°$ C. in the temperature range of 50 C to 300° C. The high softening point of sheet 12 allows sheet 12 to withstand high processing temperatures, such as temperatures of between 600-1200° C. for depositing, sintering, annealing and/or crystallizing battery materials. The low coefficient of thermal expansion of sheet 12 provides structural and dimensional stability to battery 10 with changes in temperature, as may occur during manufacturing of battery 10 or in use of battery 10.

In various embodiments, sheet 12 is a strong and flexible substrate which may allow battery 10 to be flexible. In various embodiments, sheet 12 is bendable such that the thin sheet bends to a radius of curvature of at least 500 mm without fracture when at room temperature of 25° C. In specific embodiments, sheet 12 is bendable such that the thin sheet bends to a radius of curvature of at least 300 mm without fracture when at room temperature of 25° C., and more specifically to a radius of curvature of at least 150 mm without fracture when at room temperature of 25° C. Bending of sheet 12 may also help with roll-to-roll applications, such as processing across rollers in automated manufacturing equipment, such as a battery manufacturing line. This may allow formation using high throughput manufacturing techniques such as those used in semiconductor processing.

In various embodiments, sheet 12 is a transparent or translucent sheet of silica glass. In one embodiment, sheet 12 has a transmittance greater than 90% and more specifically greater 95%. In various embodiments, sheet 12 also is light weight allowing a decrease in the total weight of the battery utilizing sheet 12. Further, sheet 12 has a relatively low density compared to conventional battery substrate materials. In addition the high purity of sheet 12 is highly non-reactive such as 99%, and more preferably greater than 99.9%, for non-reactivity with electro-active materials.

Figure 5:
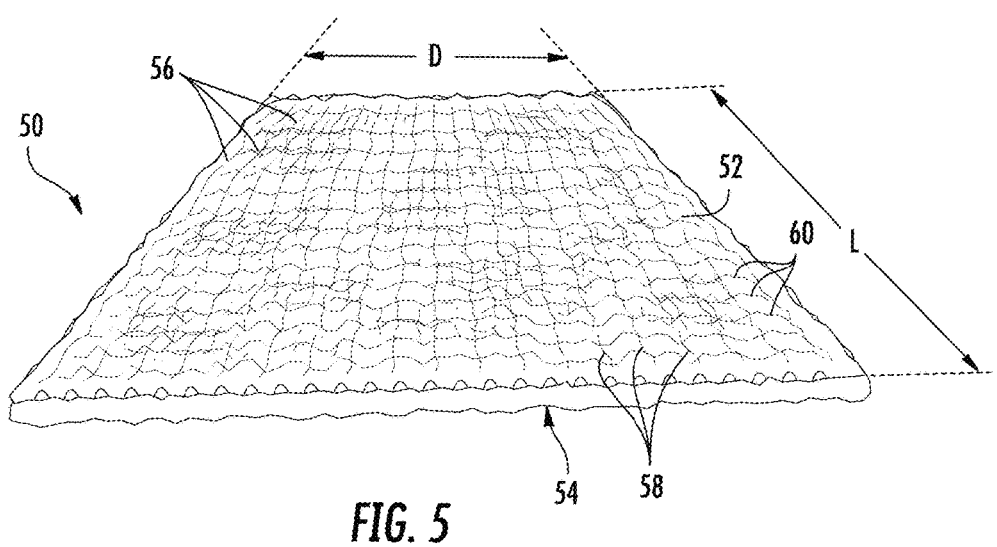
FIG. 5 is a schematic representation from a perspective view of a substrate according to another exemplary embodiment.

Referring generally to FIG. 5, a high silica content substrate, shown as silica sheet 50, is shown according to an exemplary embodiment. Silica sheet 50 is substantially the same as sheet 12 except as discussed herein. In general, silica sheet 50 includes a first major surface, shown as upper surface 52, and a second major surface, shown as lower surface 54. In the embodiment shown, sheet 50 includes intersecting elongate features 56 (e.g., raised elongate features, recessed elongate features, grooves, ridges, channels, canals, etc.). In some embodiments, some or all of the elongate features 56 have a length that is at least ten times a width thereof. According to an exemplary embodiment, at least some of the elongate features 56 have a width that is greater than 2 μm and less than 10 mm, such as greater than 10 μm and less than 5 mm, such as greater than 50 μm and less than 2 mm. In one embodiment, width of elongate features 56 is the distance between points on either side of peak that goes below average surface elevation. For such embodiments, texture of the surface 52 and 54 is at least in part formed by the intersecting elongate features 56, such as in addition to unpolished nanostructure as shown in FIGS. 2 and 3.

In some embodiments, elongate features 56 include a first group of raised features 58 and a second group of raised features 60 that both extend outward from upper surface 52. In various embodiments, lower surface 54 includes raised features 58 and 60 similar to upper surface 52. In one embodiment, raised features 58 and 60 form a pattern of crisscrossing elongate features. In the embodiment shown, raised features 58 generally extend in the direction of dimension L, and raised features 60 generally extend in the direction of dimension D, and in this arrangement, raised features 58 and 60 intersect each other forming a grid like pattern. In a specific embodiment, raised features 58 are linear features that are generally parallel to dimension L, and raised features 60 are linear features parallel to dimension D. However in other embodiments, raised features 58 and 60 may be at nonperpendicular angles relative to each and may be nonparallel to dimensions L and D, respectively, and in some embodiments, raised features 58 and 60 may be nonlinear. Similar to raised features 40 (shown in FIG. 2), raised features 58 and 60 may extend a distance of at least 1 μm above the lowest point of the surface 52, specifically as at least 2 μm above, and more specifically such as at least 5 μm above.

Figure 6:
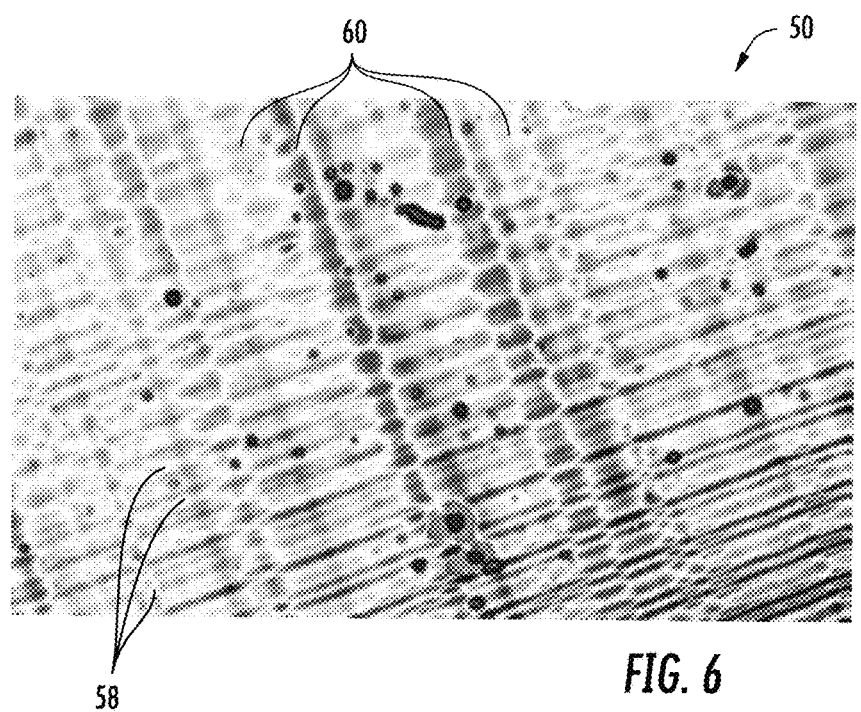
FIG. 6 is a 3D micro-scale representation of a measured profile of a surface of a substrate according to an exemplary embodiment.

As shown in FIG. 6, a 3D micro-scale representation of the profile of upper surface 52 of sheet 50 is shown according to an exemplary embodiment. Control of the shape and orientation of the elongate features may be achieved by laser sinter, as described herein. The intersecting elongate features 56 may facilitate bonding with the deposited battery layers as discussed herein.

Figure 7:
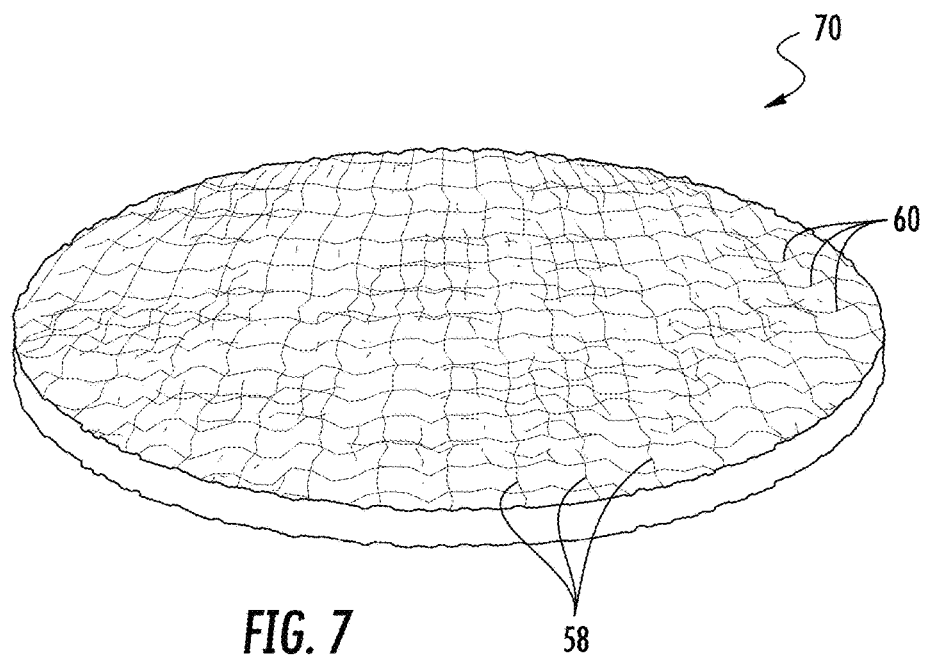
FIG. 7 is a schematic representation from a perspective view of a substrate according to another exemplary embodiment.

Referring to FIG. 7, a high silica content substrate, shown as silica sheet 70, is shown according to an exemplary embodiment. Silica sheet 70 is substantially the same as sheet 50 except as discussed herein. Sheet 70 is circular in cross-sectional shape.

Figure 8:
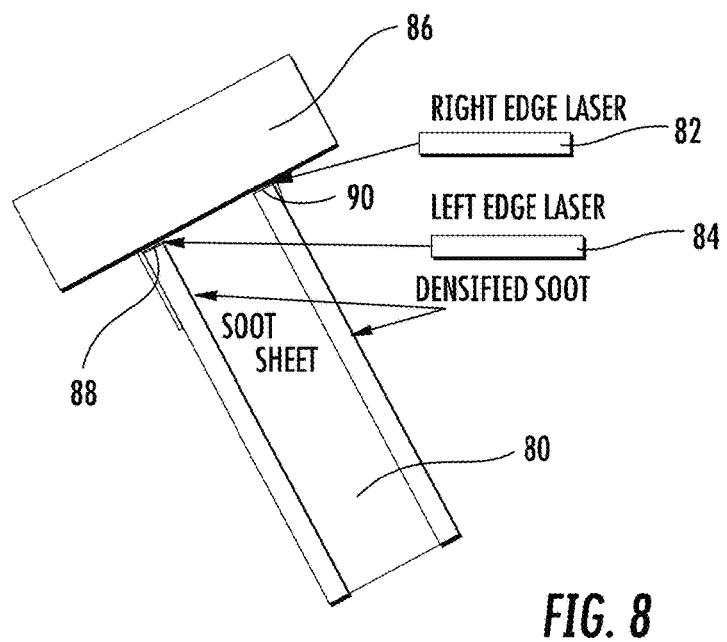
FIGS. 8 and 9 are schematic representations from a perspective view of substrates manufactured according to exemplary embodiments.
Figure 9:
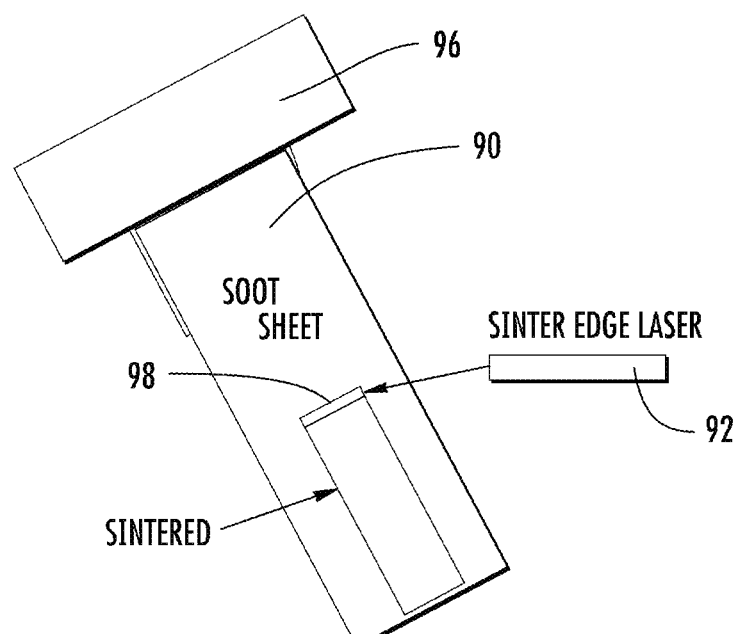

Referring now to FIGS. 8 and 9, soot sheets 80, 90 (e.g., sheet of $SiO_2$ soot, quartz soot, a soot form of a glass or precursor thereof, such as any glass material described herein) are shown. In one embodiment soot sheets 80, 90 may be sintered and used as substrates as described herein, and in another embodiment, soot sheets 80, 90 may be partially sintered or unsintered and used as a substrate as discussed herein. For example, in various embodiments, soot of soot sheets 80, 90 may be pressed into a sheet having a low density, such as less than 1.5 $g/cm^3$, such as less than 1 $g/cm^3$, such as less than 0.5 $g/cm^3$. FIGS. 8 and 9 show lasers 82, 84, 92 (e.g., $CO_2$ lasers, greater than 100 Watt laser, greater than 200 W laser, less than 2000 W laser) at least partially sintering and/or densifying the respective soot sheets 80, 90, which are extending from manufacturing equipment 86, 96 such as a soot deposition rotor, tread, wheel, roller, or other such equipment.

While other sintering devices may be used to achieve some embodiments, Applicants have discovered advantages with laser sintering in the particular ways disclosed herein. For example, Applicants found that laser sintering may not radiate heat that damages surrounding equipment or overheat and burn up the susceptor (e.g., platinum susceptor, graphite) which may be concerns with sintering via induction heating and resistance heating. Applicants found that laser sintering has good control of temperature and repeatability of temperature and may not bow or otherwise warp the ribbon, which may be concerns with flame sintering. In comparison to such other processes, laser sintering may provide the required heat directly and only to the portion of the soot sheet needing to be sintered. Laser sintering may not send contaminates and gas velocity to the sintering zone, which may upset manufacturing of the thin sheets. Further, laser sintering is also scalable in size or for speed increases.

According to an exemplary embodiment, a laser(s) 82, 84, 92 may be directed by lenses (e.g., on ends thereof, spaced apart therefrom) to form a laser energy plane 88 (e.g., beam of rectangular cross-section), 90, 98 to sinter the soot sheet to glass, such as to produce a ribbon of high viscosity glass. Some embodiments of the process include fully sintering the soot sheet from low density soot sheet (e.g., 0.5 $g/cm^3$) to fully sintered, such as having a density greater than 1.0 $g/cm^3$, such as greater than 1.5 $g/cm^3$, such as greater than 2.0 $g/cm^3$ (e.g., 2.2 $g/cm^3$) or more, such as by any of the above processes, and preferably by the laser(s) 82, 84, 92.

Other embodiments include partially sintering the soot sheet 80 such that the soot sheet has a density greater than 0.5 $g/cm^3$ and/or less than 2.2 $g/cm^3$. Partially sintered soot sheets may hold together better than unsintered sheets, such as being able to hold to be rolled on a spool (e.g., spool diameter of at least 1 in and/or no more than 12 in). In contemplated embodiments, unsintered soot sheets or partially sintered soot sheets, of materials as described herein, may be used as end products, such as serving as substrates, layers, barriers, etc., such as to receive and support layers of battery materials or for other purposes. Likewise, glass substrates described herein may be used for purposes other than for supporting layers of battery materials.

Referring to FIGS. 8 and 9, in some embodiments the process at least partially (e.g., fully) sinters columns or other shapes of glass or densified soot through the soot sheet in selected patterns. Alternatively, masking may be used to isolate portions of the soot sheet, which may then be removed or otherwise sintered to create geometry, such as a patterned profile for cathode deposition. Some such selective and/or partial sintering may not be possible or may be extremely difficult with processes other than laser sintering. In some embodiments, use of a laser to sinter the edges of the soot sheet fully or partially, just prior to removing the soot sheet from the manufacturing line (e.g., following deposition on a rotor) overcomes processing issues where edges or ends of the soot sheet may tear or crack. This full or partial sintering of the edges prior to sheet removal from the manufacturing line may strengthen the edge and inhibit tearing or cracking.

In various embodiments, following the formation of a high silica sheet as shown in FIGS. 8 and 9, one or more coating or layer may be deposited onto the upper or lower surface of the silica substrate (such as sheets 12, 50, 70, etc.). In various embodiments, the formation process relates to formation of a battery such as battery 10 discussed above. In such embodiments, a layer of battery material is deposited on to the substrate. In various embodiments, at least one of a cathode, anode or electrolyte material is deposited on the substrate. In a specific embodiment, a cathode material is deposited, annealed and crystalized onto the substrate.

As used herein, the silica ($SiO_2$) containing sheet may be a thin sheet formed from deposited silica soot, may also be a thin sheet of silica glass formed by fully sintering the silica soot sheet, and may also be a thin sheet of partially sintered silica soot. In various embodiments, the silica soot sheets disclosed herein are formed by a system that utilizes one or more glass soot generating device (e.g., a flame hydrolysis burner) that is directed or aimed to deliver a stream of glass soot particles on to a soot deposition plate. As noted above, the silica sheets discussed herein may include one or more dopant. In the example of a flame hydrolysis burner, doping can take place in situ during the flame hydrolysis process by introducing dopant precursors into the flame. In a further example, such as in the case of a plasma-heated soot sprayer, soot particles sprayed from the sprayer can be pre-doped or, alternatively, the sprayed soot particles can be subjected to a dopant-containing plasma atmosphere such that the soot particles are doped in the plasma. In a still further example, dopants can be incorporated into a soot sheet prior to or during sintering of the soot sheet. Example dopants include elements from Groups IA, IB, IIA, IIB, IIIA, IIIB, IVA, IVB, VA, VB and the rare earth series of the Periodic Table of Elements. In various embodiments, the silica soot particles may be doped with a variety of materials, including germania, titania, alumina, phosphorous, rare earth elements, metals and fluorine.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An electrochemical battery assembly comprising:
   (A) a high silica content substrate comprising:
      (i) a first major surface;
      (i) a second major surface opposite the first major surface;
      (iii) at least 90% $SiO_2$ by weight;
      (iv) an average thickness between the first major surface and the second major surface of less than 500 µm; and
      (v) a minimum dimension orthogonal to the thickness that is less than 100 m and greater than 1 mm;
      (vi) a width and a length that are each less than 100 m and greater than 1 mm;
      (vii) an outer perimeter surface extending between the first major surface and the second major surface;
      (viii) a first group of a plurality of raised elongate features formed in the first major surface and extending in the direction of the width, wherein each raised elongate feature of the first group has a length and a width and the length is at least ten times larger than width, wherein the width of each elongate feature of the first group is between 10 mm and 2 µm; and
      (ix) a second group of a plurality of raised elongate features formed in the first major surface and extending in the direction of the length, wherein at least some of the raised elongate features of the second group intersect raised elongate features of the first group, wherein each raised elongate feature of the second group has a length and a width and the length is at least ten times larger than width, wherein the width of each raised elongate feature of the second group is between 10 mm and 2 µm;
      (x) wherein at least some of the raised elongate features of the first group and of the second group extend from the surface a distance of at least 2 µm beyond a lowest portion of the first major surface; and
      (xi) wherein the surface area of the first major surface is at least 1.5 times the area of the cross-sectional shape defined by the outer perimeter surface of the substrate; and
   (B) a first layer of a first battery material bonded to the first major surface of the substrate, wherein the first battery material is one of a cathode material, an anode material, an electrolyte and a current collector material.

2. The electrochemical battery assembly of claim 1, wherein the first battery material is a current collector material, the electrochemical battery assembly further comprising:
   a second layer of a second battery material bonded to the first layer, wherein the second battery material is one of a cathode material and an anode material;

a third layer of a third battery material bonded to the second layer, wherein the third battery material is an electrolyte material;

a fourth layer of a fourth battery material bonded to the third layer, wherein the fourth battery material is one of a cathode material and an anode material; and a fifth layer of a current collector material bonded to the fourth layer.

3. The electrochemical battery assembly of claim 2, having a total thickness measured between opposing outermost surfaces of the battery assembly in a direction perpendicular to the first major surface, wherein the thickness of the substrate accounts for less than 60% of the total thickness of the battery assembly.

4. The electrochemical battery assembly of claim 2, wherein the cathode material includes at least one of $LiCoO_2$, $LiMn_2O_4$ $LiFePO_4$, Li sulfur, Li mixed metal phosphates, and Li mixed metal oxides, wherein the anode material includes at least one of graphite, $LiNiMnCoO_2$, $Li_4Ti_5O_{12}$, an alloy of tin and cobalt and silicon-carbon materials, wherein the electrolyte material is lithium phosphorus oxynitride.

5. The electrochemical battery assembly of claim 4, wherein the substrate is nonreactive with the cathode material at voltages from 0.1 V to 5.5 V.

6. The electrochemical battery assembly of claim 1, wherein the substrate consists of at least 99% $SiO_2$ by weight.

7. The electrochemical battery assembly of claim 1, wherein the substrate bends to a radius of curvature of at least 500 mm without fracture when at room temperature of 25° C.

8. The electrochemical battery assembly of claim 1, wherein the cross-sectional shape defined by the outer perimeter surface of the substrate is non-circular.

9. The electrochemical battery assembly of claim 1, wherein the cross-sectional shape defined by the outer perimeter surface of the substrate is rectilinear.

10. The electrochemical battery assembly of claim 1, wherein the substrate is a fused quartz material.

11. The electrochemical battery assembly of claim 1, wherein the substrate is formed from a glass of $(SiO_2)_{1-x-y}.M'_xM''_y$ composition, where either or both of M' and M" is an element, dopant, or substitution, which may be in an oxide form, or combination thereof, or is omitted, and where the sum of x plus y is less than 1.

12. The electrochemical battery assembly of claim 1, wherein the substrate has a thickness less than 250 µm.

13. The electrochemical battery assembly of claim 1, wherein the substrate has a softening point temperature greater than 700° C.

14. The electrochemical battery assembly of claim 1, wherein the substrate has a low coefficient of thermal expansion, that being less than $10 \times 10^{-7}/°$ C. in the temperature range of about 50° C. to 300° C. thereby facilitating dimensional stability to the substrate during formation of the first battery material on the substrate.

15. An assembly comprising:
(A) a substrate comprising:
   (i) a first major surface;
   (ii) a second major surface opposite the first major surface; and
   (iii) at least 99% by weight silica, wherein the substrate is formed from a glass of $(SiO_2)_{1-x-y}.M'_xM''_y$ composition, where either or both of M' and M" is an element, dopant, or substitution, which may be in an oxide form, or combination thereof, or is omitted, and where the sum of x plus y is less than 1;
   (iv) wherein the first major surface comprises a plurality raised features and a plurality of recessed features, wherein at least some of the raised features extend from the surface a distance of at least 10 angstroms further than the recessed features;
   (v) an outer perimeter surface extending between the first major surface and the second major surface, wherein the plurality of raised and recessed features comprises:
      (a) a first group of a plurality of raised elongate features formed in the first major surface and extending in the direction of the width, wherein each raised elongate feature of the first group has a length and a width and the length is at least ten times larger than width, wherein the width of each raised elongate feature of the first group is between 10 mm and 2 µm; and
      (b) a second group of a plurality of raised elongate features formed in the first major surface and extending in the direction of the length, wherein at least some of the raised elongate features of the second group intersect a raised elongate feature of the first group, wherein each raised elongate feature of the second group has a length and a width and the length is at least ten times larger than width, wherein the width of each elongate feature of the second group is between 10 mm and 2 µm;
      (c) wherein at least some of the raised features of the first group and of the second group extend from the surface a distance of at least 1 µm beyond the lowest portion of the first major surface;
   (vi) wherein the surface area of the first major surface is at least 1.5 times the area of the cross-sectional shape defined by the outer perimeter surface of the substrate; and
(B) a coating positioned directly on the first major surface such that an inner surface of the coating contacts the first major surface, wherein the coating is a contiguous coating that extends over at least one recessed feature and at least one raised feature and is contiguous for at least 1% of the width and the length of the substrate.

16. The assembly of claim 15, wherein the coating contiguously covers at least 25% of the first major surface.

17. The assembly of claim 16, wherein the coating is formed from a first battery material, wherein the first battery material is one of a cathode material, an anode material, an electrolyte material and a current collector material.

18. The assembly of claim 17, wherein the first battery material is a cathode material, and the cathode material is at least one of $LiCoO_2$, $LiMn_2O_4$ $LiFePO_4$, Li sulfur, Li mixed metal phosphates, and Li mixed metal oxides.

19. The assembly of claim 15, wherein the substrate has an average thickness between the first major surface and the second major surface between 1 µm and 250 µm.

20. The assembly of claim 15, wherein the substrate bends to a radius of curvature of at least 500 mm without fracture when at room temperature of 25° C.

21. The assembly of claim 15, wherein the substrate has a softening point temperature greater than 700° C.

22. The assembly of claim 15, wherein the substrate has a low coefficient of thermal expansion, that being less than $10 \times 10^{-7}/°$ C. in the temperature range of about 50° C. to 300° C., thereby facilitating dimensional stability to the substrate during formation of the coating on the substrate.

23. The assembly of claim 15, wherein a width and a length of the substrate that are each less than 100 m and greater than 2 mm.

24. A fused quartz substrate comprising:
  a first major surface having a surface area greater than 1 mm²;
  a second major surface opposite the first major surface;
  an outer perimeter surface extending between the first major surface and the second major surface;
  at least 99% by weight silica;
  an average thickness between the first major surface and the second major surface of less than 500 μm; and
  a width and a length that are less each than 100 m and greater than 1 mm;
  a first group of a plurality of raised elongate features formed in the first major surface and extending in the direction of the width, wherein each raised elongate feature of the first group has a length and a width and the length is at least ten times larger than width, wherein the width of each elongate feature of the first group is between 10 mm and 2 μm; and
  a second group of a plurality of raised elongate features formed in the first major surface and extending in the direction of the length, wherein at least some of the raised elongate features of the second group intersect a raised elongate feature of the first group, wherein each raised elongate feature of the second group has a length and a width and the length is at least ten times larger than width, wherein the width of each elongate feature of the second group is between 10 mm and 2 μm;
  wherein at least some of the raised elongate features of the first group and of the second group extend from the surface a distance of at least 10 angstroms beyond the lowest portion of the first major surface;
  wherein the surface area of the first major surface is at least 1.5 times the area of the cross-sectional shape defined by the outer perimeter surface of the substrate.

25. The fused quartz substrate of claim 24, wherein the substrate has a thickness less than 250 μm.

26. The fused quartz substrate of claim 25 wherein the substrate is formed from a material of $(SiO_2)_{1-x-y} \cdot M'_x M''_y$ composition, where either or both of M' and M" is an element, dopant, or substitution, which may be in an oxide form, or combination thereof, or is omitted, and where the sum of x plus y is less than 1.

27. The fused quartz substrate of claim 24, wherein the substrate bends to a radius of curvature of at least 500 mm without fracture when at room temperature of 25° C.

28. The fused quartz substrate of claim 24, wherein the substrate has a softening point temperature greater than 700° C.

29. The fused quartz substrate of claim 24, wherein the substrate has a low coefficient of thermal expansion, that being less than $10 \times 10^{-7}/°$ C. in the temperature range of about 50° C. to 300° C.

* * * * *